US012719320B2

(12) United States Patent
Schmitt et al.

(10) Patent No.: US 12,719,320 B2
(45) Date of Patent: Aug. 25, 2026

(54) ELECTRIC MOTOR SPEED-INDEPENDENT SYMMETRIC COOLANT FLOW DESIGN

(71) Applicant: Ford Global Technologies, LLC, Dearborn, MI (US)

(72) Inventors: Matthew Schmitt, Southgate, MI (US); Joel Hetrick, Ann Arbor, MI (US); Devan Anderson, Taylor, MI (US); Jeremy Ikerd, Eastpointe, MI (US); Bharath Madduri, Canton, MI (US); Chin-Yuan Perng, Ann Arbor, MI (US); Sudhir Kumar, Ann Arbor, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 312 days.

(21) Appl. No.: 18/333,122

(22) Filed: Jun. 12, 2023

(65) Prior Publication Data

US 2024/0413687 A1 Dec. 12, 2024

(51) Int. Cl.
*H02K 1/32* (2006.01)
*H02K 1/2706* (2022.01)
*H02K 7/00* (2006.01)

(52) U.S. Cl.
CPC ............. *H02K 1/32* (2013.01); *H02K 1/2706* (2013.01); *H02K 7/003* (2013.01)

(58) Field of Classification Search
CPC ........ H02K 1/32; H02K 1/2706; H02K 7/003; H02K 9/19
See application file for complete search history.

(56) References Cited

U.S. PATENT DOCUMENTS

| | | | | |
|---|---|---|---|---|
| 4,418,777 | A | 12/1983 | Stockton | |
| 8,242,646 | B2 | 8/2012 | Tatematsu et al. | |
| 9,627,943 | B2 | 4/2017 | Tokunaga et al. | |
| 2013/0221772 | A1 | 8/2013 | Miyamoto et al. | |
| 2019/0207451 | A1* | 7/2019 | Yoshizawa ............. | H02K 1/276 |
| 2020/0244123 | A1 | 7/2020 | Kang | |
| 2020/0251963 | A1 | 8/2020 | Woody et al. | |
| 2021/0265886 | A1* | 8/2021 | Larson ..................... | H02K 9/19 |
| 2022/0263384 | A1 | 8/2022 | Kapatral et al. | |
| 2022/0399770 | A1* | 12/2022 | Tardy ..................... | H02K 21/14 |

FOREIGN PATENT DOCUMENTS

| | | |
|---|---|---|
| CN | 114552832 A | 5/2022 |

* cited by examiner

*Primary Examiner* — Christopher M Koehler
*Assistant Examiner* — Riley Owen Stout
(74) *Attorney, Agent, or Firm* — McCoy Russell LLP

(57) ABSTRACT

An electric motor may be provided having a rotor shaft having an internal oil channel therein and a plurality of radial feed oil channels positioned about a middle and center of the rotor shaft, a rotor core, the rotor core having a plurality of axial channels therein, and a pair of end plates coupled to the rotor shaft, where each end plate has alternating inclined channels and drain holes so as to alternate a flow direction of the oil in each adjacent pole.

20 Claims, 8 Drawing Sheets

646
642
644
654
652
656
658
638
636
634
608
622
624
620
618
648
606
614
616
612
632
610
452
600
602
614
616
301
y
x
z

ELECTRIC MOTOR SPEED-INDEPENDENT SYMMETRIC COOLANT FLOW DESIGN

FIELD

The present description relates generally to a rotor cooling system for an Internal Permanent Magnet (IPM) motor that uses centripetal force to move coolant with a uniform flow from a centrally located feed in a shaft to a plurality of passages throughout the magnets of a rotor core.

BACKGROUND/SUMMARY

A vehicle such as a hybrid vehicle or a fully electric vehicle (EV) may use an electric machine such as a motor for power to drive a vehicle in a direction. The vehicle may use an internal permanent magnet (IPM) electric machine as a motor and as a generator. Each magnetic pole on the rotor may be formed by putting permanent magnet material into slots in the laminated stack of the rotor. Such slots may not be completely filled with magnetic material, instead being designed to hold a magnet in the center with voids or non-magnetic material at two opposite ends of the slot.

In addition to producing torque, electromagnetic interactions between windings of the stator and magnets of the rotor may produce waste heat, which can build in the material of the rotor. Temperature increases may decrease the efficiency of the electric machine or cause degradation to the rotor and other components of the electric machine. As such, a coolant system may be used where coolant, such as oil, may be passed through a plurality of passages through the rotor core to remove waste heat and mitigate temperature differences throughout the rotor.

However, it may be difficult keep the quantity of coolant uniform throughout the various regions of the cooling system to cool and mitigate the temperature of the magnet and rotor core. Decrease in uniformity of coolant may prevent homogeneous heat extraction, resulting in regions of the rotor core with different temperatures. The motors may be fed coolant asymmetrically, where coolant is passed from one end of rotor to the other. The asymmetrically distribution of coolant may result in temperature uniformity for sections of the motor normal to the path of the oil, but a temperature gradient across the rotor with respect to the length of the coolant path. Other solutions for cooling an IPM use multiple source points of coolant, such as holes on opposite ends of the rotor, to distribute coolant throughout the rotor core to mitigate temperature. A hole on a first side to a first channel and a hole on a second side may be connected to a second channel, wherein fluid in the first channel and second channel may travel in opposite directions. Using multiple source points of coolant to the rotor core may increase complexity to the coolant system and rotor. Using multiple source points of coolant to the rotor core may increase complexity to the coolant system and rotor. Additionally, the using multiple source points may limit coolant flow by the speed of rotation of the shaft.

As one example, U.S. Pat. No. 4,418,777 feeds coolant to an internal channel along the axis of the shaft of the rotor of an electric machine. In the shaft, the coolant may split evenly toward opposite ends of the rotor, allowing for coolant to continuously mix and near uniform cooling throughout as the rotor spins about the axis. However, this method of coolant is used for an induction electric machine, without a permanent magnetic core. Due to the architectural differences between an IPM and an induction motor, the cooling may be less effective. Coolant from the shaft and at the ends of the rotor may not be distributed close enough to the magnets to remove heat or mitigate temperature until the shaft of the rotor experiences a great enough flux of thermal energy from the rotor core, at which point magnets and other portions of the core may be overheated.

The inventors herein have recognized potential issues with such systems. As one example, an electric motor may be provided comprising a rotor shaft having an internal oil channel therein and a plurality of radial feed oil channels positioned about a middle and center of the rotor shaft, a rotor core, the rotor core having a plurality of axial channels therein, and a pair of end plates coupled to the rotor shaft, where each end plate has alternating inclined channels and drain holes so as to alternate a flow direction of the oil in each adjacent pole. In this way, it is possible to improve coolant flow by increasing temperature uniformity across the whole of the rotor core, providing a path for coolant closer to the magnetic poles of the rotor core, and reducing or eliminating components, such as pumps, used to force fluid throughout the rotor core. The positioning of oil channels equidistantly and such that the direction of fluid flow alternates may reduce a temperature gradient forming axially, with respect to the axis the rotor is centered about, across the rotor. Parts to the rotor may be reduced by using centripetal force and the rotational energy of the rotor to guide fluid through the channels instead of through pressure or other forces not produced by the rotor.

As one example, the architecture of cooling system in the rotor core allows for coolant experience equal flow across each magnetic pole of the rotor. The holes connecting the channel to inner passages may allow the coolant flow to remain approximately constant. Additionally, the redirection of oil may be symmetrical, with all passages being radial with respect to a central axis. There may be a passage directing oil in a first direction for each passage that directs fluid in a second opposite direction. Each passage may be positioned radially about a rotor with respect to the axis the rotor is centered on. Each passage directing oil may be positioned to alternate in a sequence, such that a passage directing fluid in a first direction may not be radially next to another passage directing oil in first direction in either a clockwise or counter clockwise direction. Additional symmetry may be added by the first and second end plate, which redirect to the flow of coolant from a direction in the inner passage to an opposite direction in an outer passage. The symmetry may increase the uniformity of the temperature of the coolant throughout the passages of the core. Holes formed through the material of the end plates may be used to direct, such as via spraying, the coolant into contact with other components, such as stator end windings, to mitigate temperature. The directing of coolant via the holes of the end plate, may reduce or eliminate the separate holes, feed mechanisms, and other components to direct fluid on components, such as the stator end windings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1A:
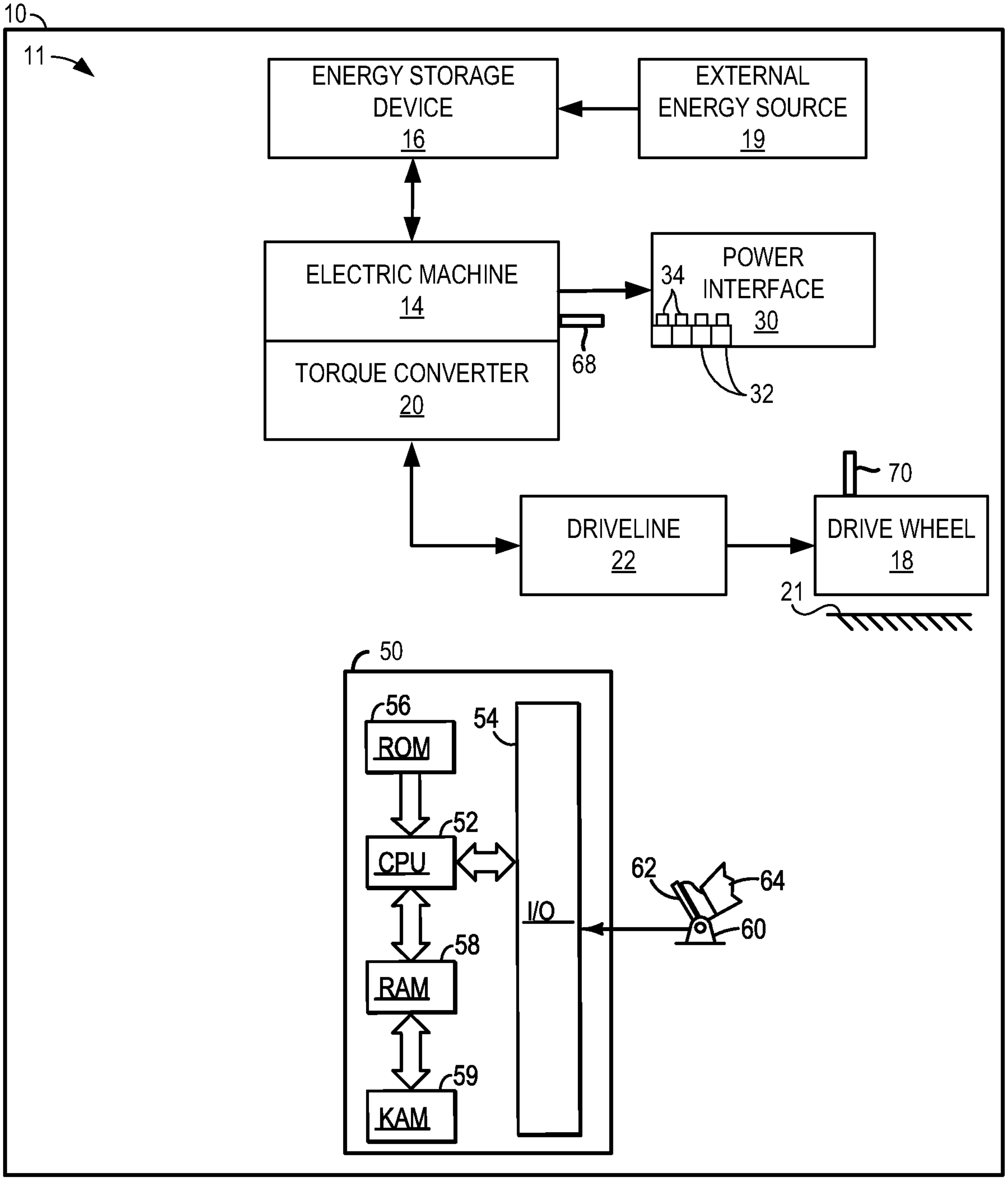
FIG. 1A shows an example powertrain in a first vehicle that may be configured to power auxiliary devices.

The following description relates to systems of a cooling assembly that may be used in the rotor core of an internal permanent magnet (IPM) electric machine, such as an interior permanent magnet electric motor. The vehicle may be a fully electric vehicle EV or a hybrid vehicle. The IPM may be used as a motor to power and provide rotational energy to a vehicle. Additionally, in one example the IPM electric machine may fulfill a role as a generator. In this example, the generator is an electric machine (e.g., a motor/generator) provided in an electric vehicle (EV) system that is configured to supply power from an energy storage device (e.g., a high voltage battery) to a power interface. The power interface enables onboard charging of auxiliary devices via energy stored in the energy storage device and in doing so reduces the range that the EV may have for travel.

The rotor core may surround a rotor shaft, wherein both the rotor core and rotor shaft are centered about an axis. There may a first plate and a second plate that may be located about and at opposite ends the shaft. The first plate and second plate may be centered approximately about the axis. The rotor core may be located between the first plate and second plate, wherein the first plate and second plate may act as end plates for opposite sides of the rotor core. The first and second plates may act as end plates for the shaft of the rotor and rotor core.

The material of the rotor core may have a plurality of slots that may be positioned approximately radially about the central axis. Each of the slots may house a plurality of magnets that are permanent magnets. The polarity/charge of the magnets in the slots may alternate each group of slots of the rotor core in clockwise or counter clockwise direction. A first passage or a second passage of cooling fluid may be located radially beneath each slot. The direction cooling fluid may flow through each passage in a different direction, with the direction alternating for each change in pole of the magnet in a slot. The first passage and second passage may be the outer most passages parallel with the axis, and referred to as a first outer passage and a second outer passage. There may be an even number of first passages, second passages, and slots, wherein the first passages, second passages, and slots may be spaced approximately symmetrically from one another. Locate radially below and between each of each of the first passages and second passages may be a passage that may be an inner most passage. The rotor shaft may have an internal channel on the rotor allowing a cooling medium, referred to herein as coolant. The coolant may enter the internal channel of the shaft from the transmission. The internal channel of the shaft may be fluidly coupled the inner passages via a plurality of holes spaced radially about and extending from the inner diameter to the outer diameter of the shaft. The centrifugal force placed on the shaft may drive the coolant from the internal channel of the shaft into the inner passages via the holes. The centrifugal force placed on the shaft may drive fluid to opposite ends of the inner passages. A plurality of passages formed on the first and second plates may fluidly couple the inner passages to the first and second outer passages. Passages on the first plate may couple the inner passages to the first outer passages. Passages on the second plate may couple the inner passages to the second outer passages. Fluid in the first outer passages may flow in first direction opposite to a second direction that fluid may flow in the second outer passages. The holes on the first and second plates may fluidly couple to the second and first passages, respectively. Fluid may leave the cooling assembly and rotor through the holes on the first and second plates.

Upon leaving the holes on the first and second plates, fluid may be directed toward other features of the electric machine, such as the as the stator end windings.

Figure 1B:
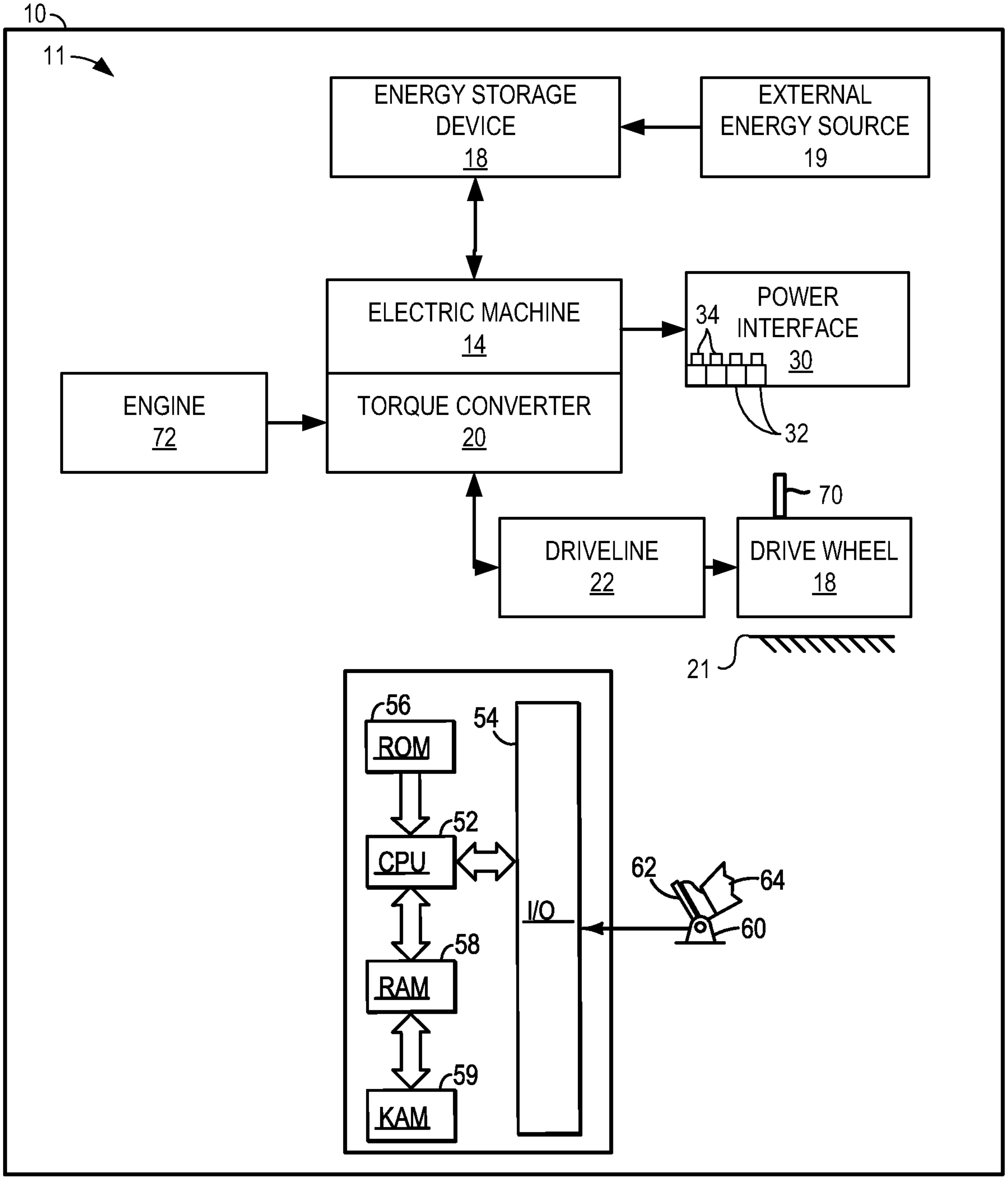
FIG. 1B shows an example powertrain in a second vehicle that may be configured to power auxiliary devices.
Figure 2:
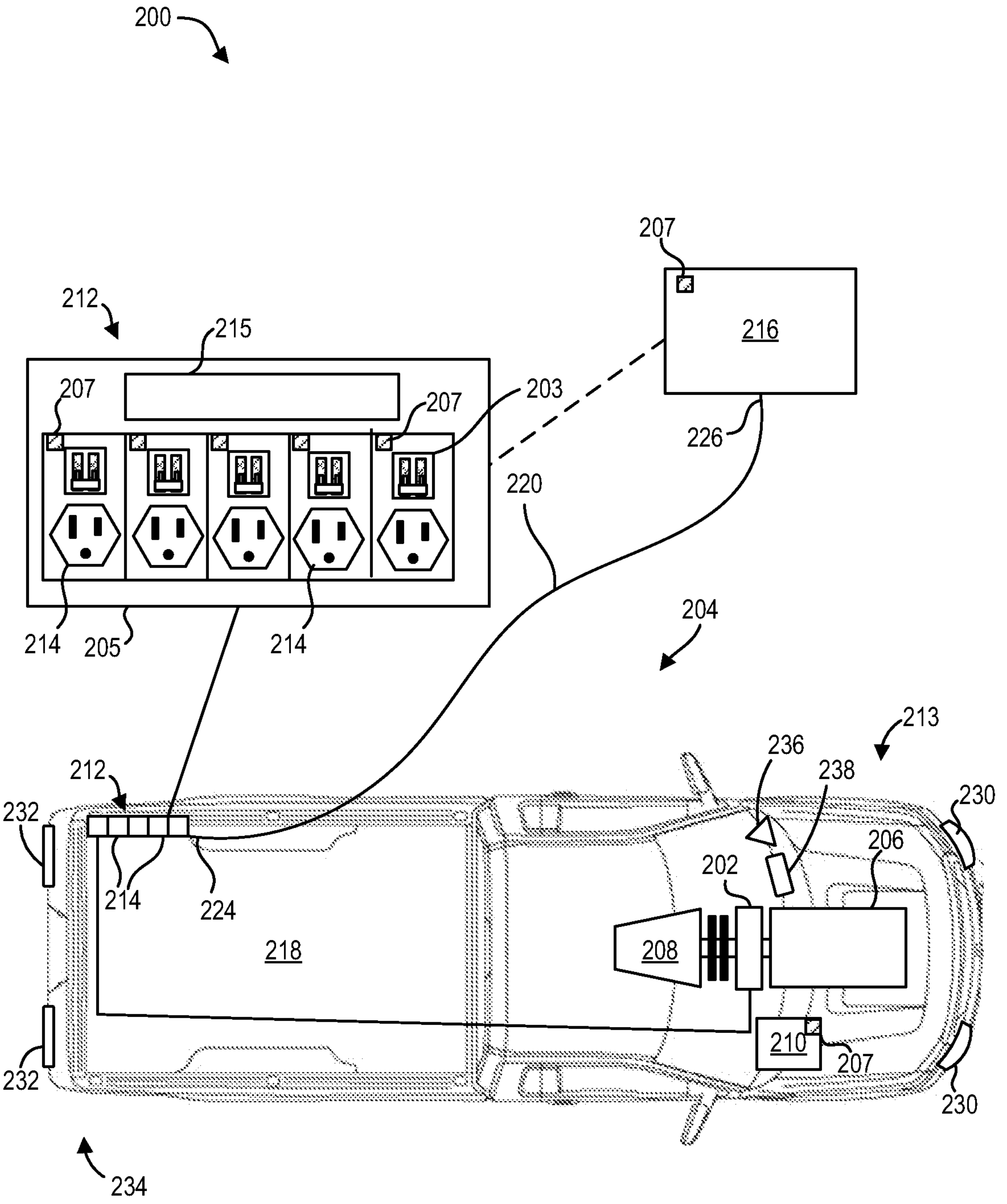
FIG. 2 shows a schematic diagram of an example of a vehicle with a power generator delivering electrical power to an auxiliary device.
Figure 3:
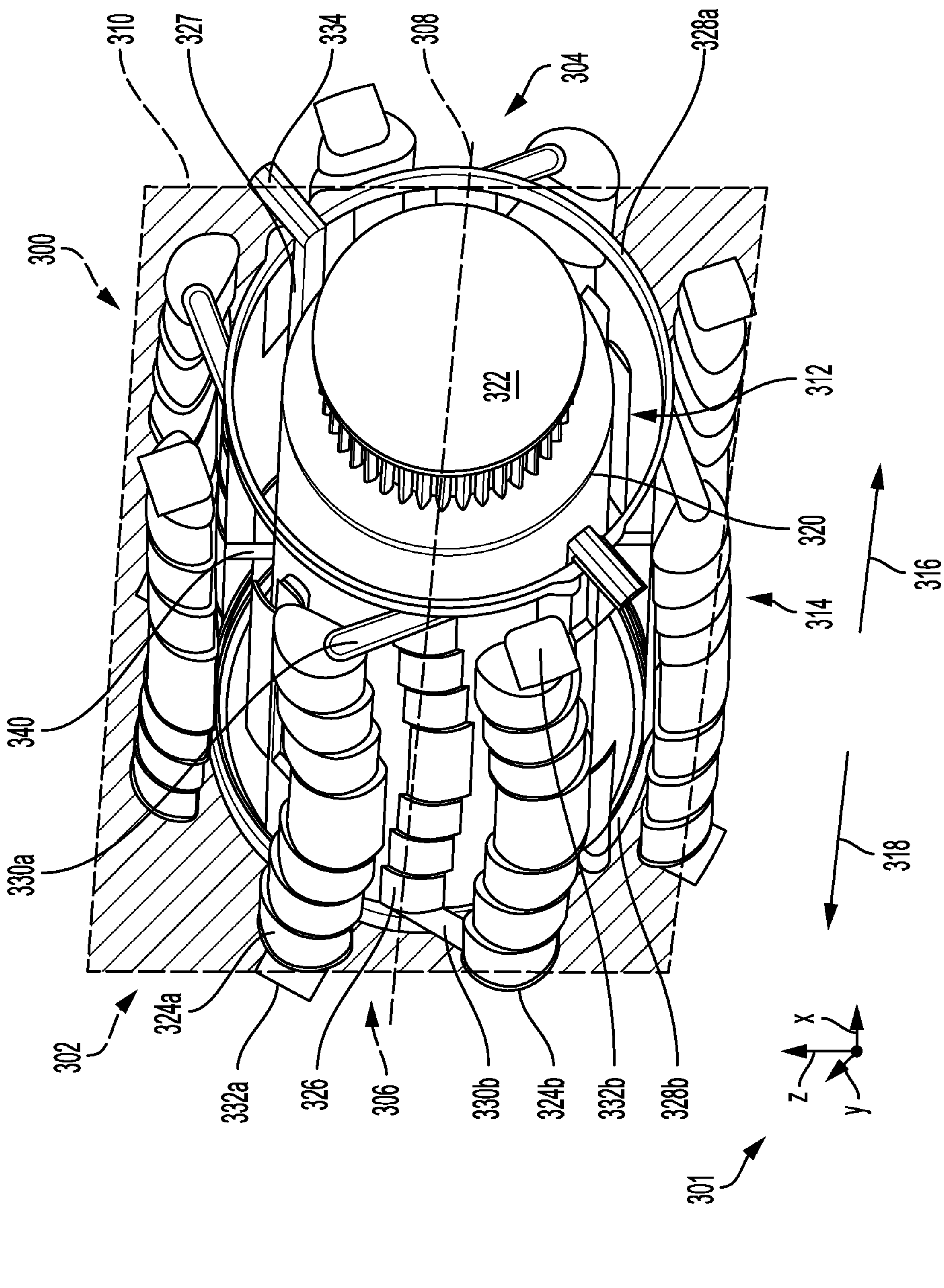
FIG. 3 shows a side view of the passages and other volumes of a cooling network that may be enclosed by parts of the rotor core
Figure 4:
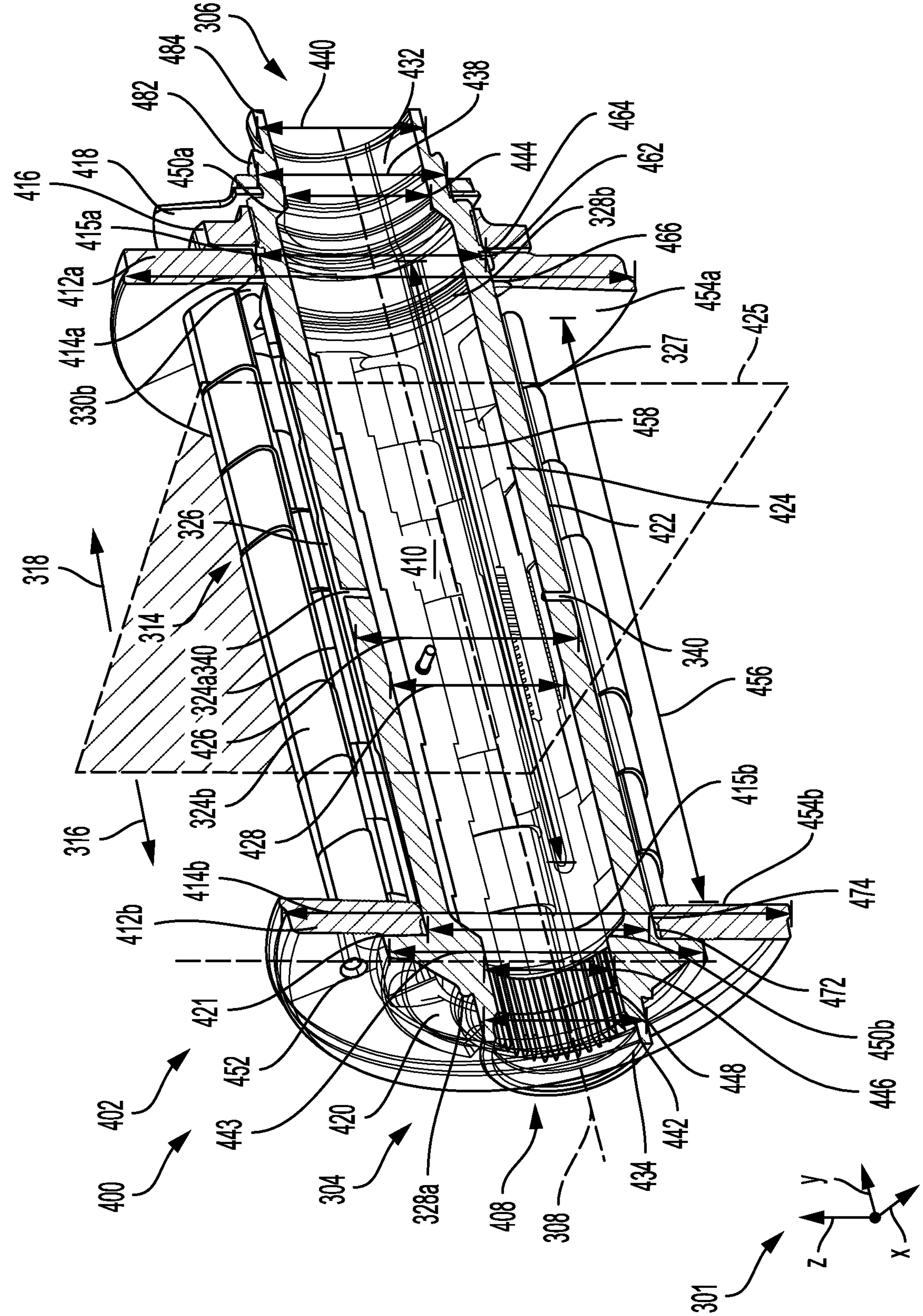
FIG. 4 shows an isometric and sectioned view the cooling network of FIG. 3 and other components coupled to a rotor shaft.
Figure 5:
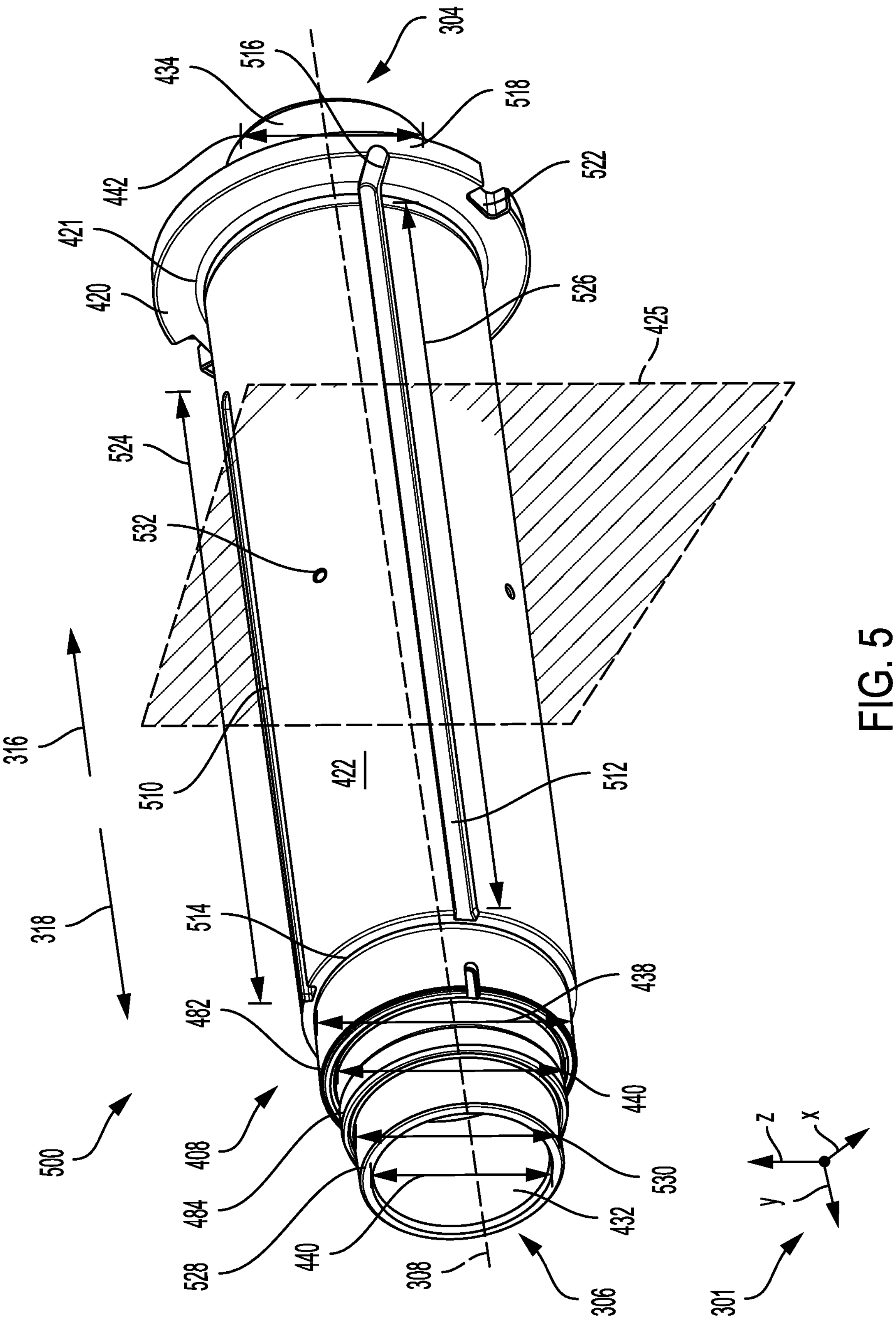
FIG. 5 shows an isometric view of the rotor shaft of FIG. 4 isolated from other components.
Figure 6:
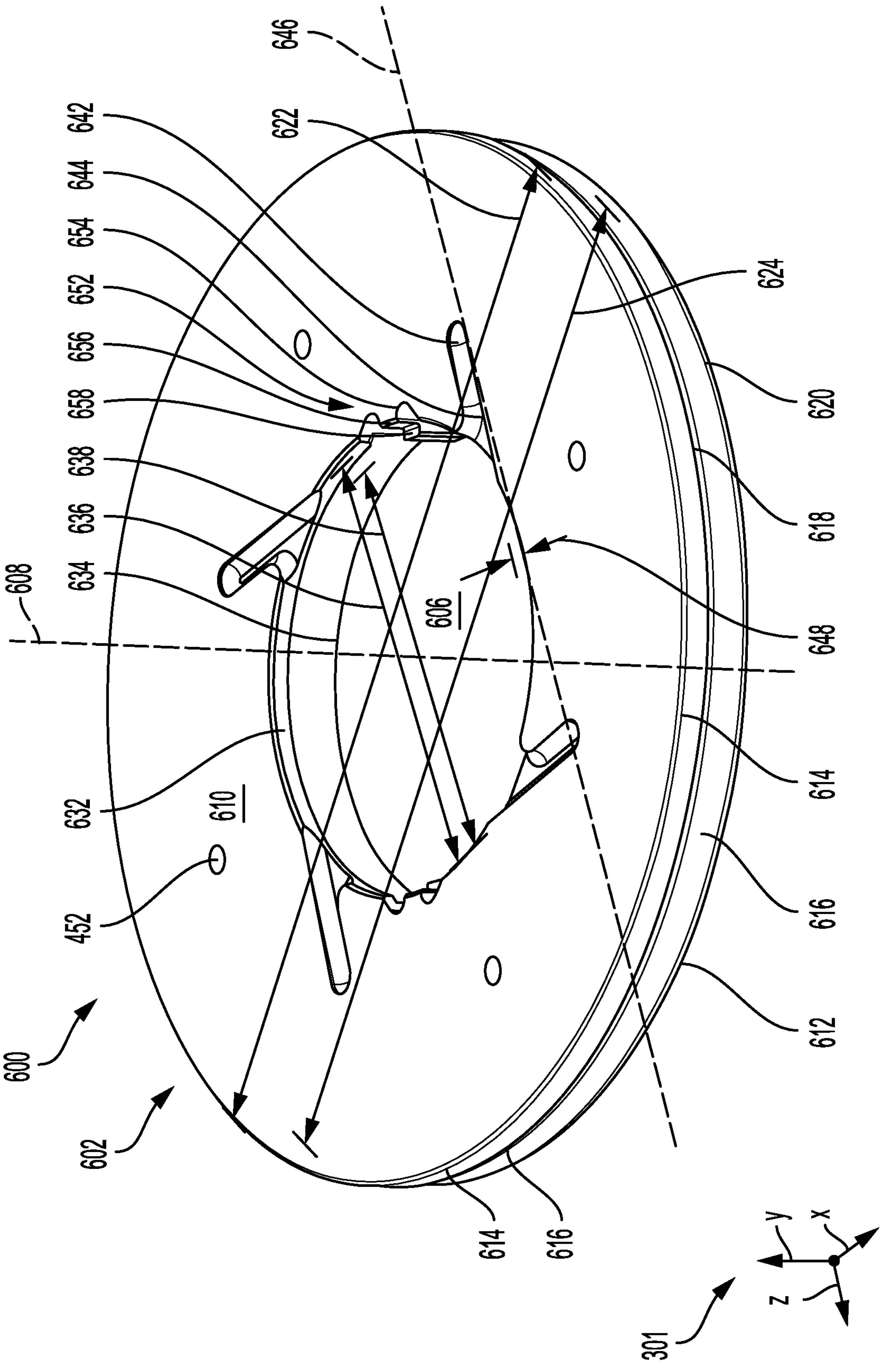
FIG. 6 shows an isometric view of a plate that may be used as an end plate isolated from the other components.
Figure 7:
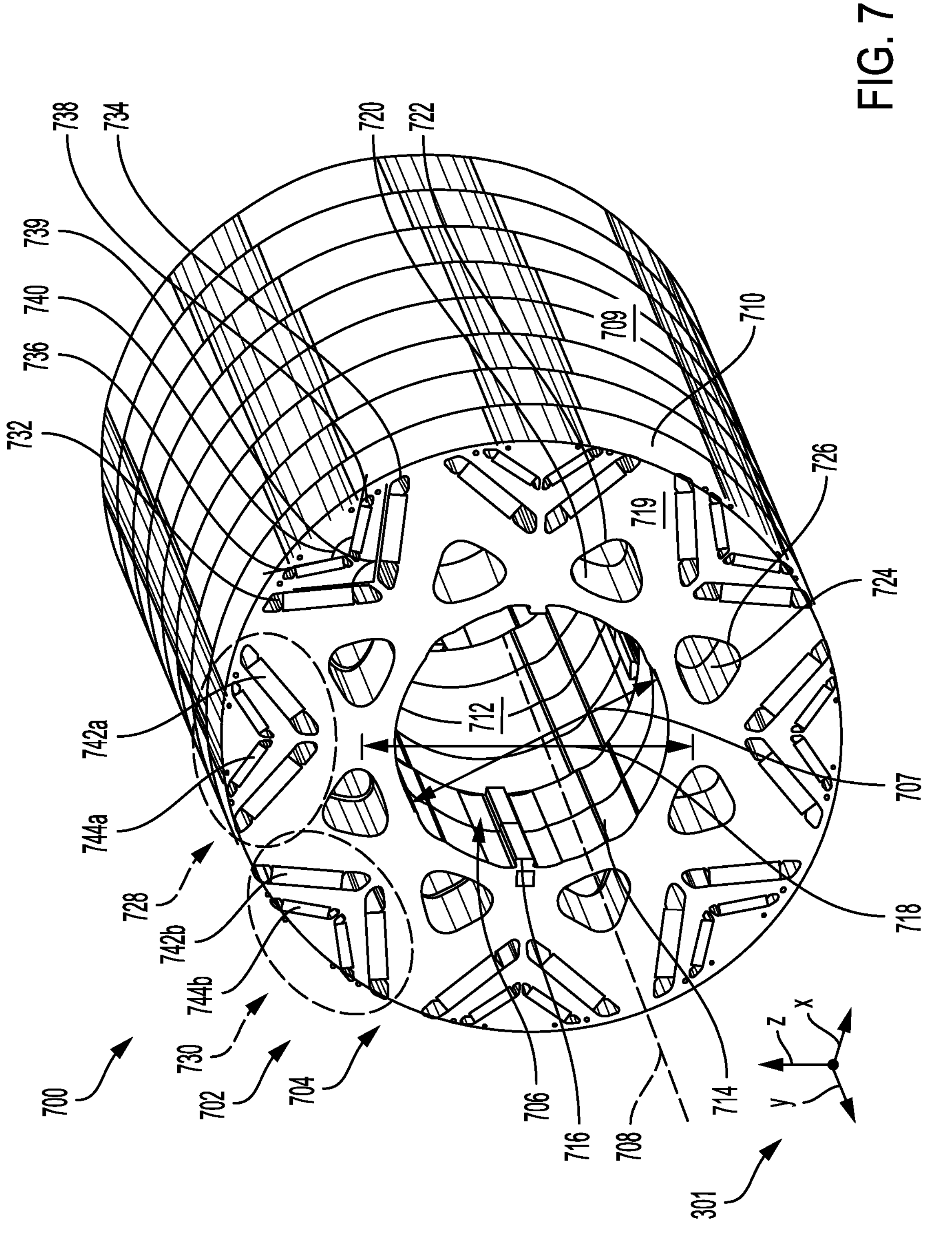
FIG. 7 shows a side view of the rotor core that may be located about the shaft of FIG. 4.

FIG. 1A-1B shows an example powertrain in a first vehicle and a second vehicle that may be configured to power auxiliary devices. For the example in FIG. 1A, the vehicle may be an all-electric vehicle (EV). For the example in FIG. 1B the vehicle may be a hybrid vehicle. FIG. 2 shows a schematic diagram of an example of a vehicle with a power generator delivering electrical power to an auxiliary device. The power generator of FIG. 2 may be an IMP electric machine and may also function as a motor. FIG. 3 shows a side view of the passages and other volumes of a cooling network that may be enclosed by parts of the rotor core. Passages and volumes of FIG. 3 include the volume of an internal channel of a shaft, a plurality of inner passages, a plurality of outer passages, and a plurality of passages that may be formed from plates coupled to the rotor core and shaft. FIG. 4 shows an isometric and sectioned view the cooling network of FIG. 3 and other components coupled to a rotor shaft. Features of the cooling network that may be enclosed by the other portions of the core are shown suspended radially about the rotor shaft. FIG. 5 shows an isometric view of the rotor shaft of FIG. 4 isolated from other components. FIG. 5 shows surface features of the rotor shaft such as groove that may form passages of FIG. 4-3. FIG. 6 shows an isometric view of a plate that may be used as an end plate isolated from the other components. FIG. 7 shows a side view of the rotor core that may be located about the shaft of FIG. 4. FIG. 7 shows the slots and holes in the housing of the rotor core that may house magnets and the holes, respectively.

It is also to be understood that the specific assemblies and systems illustrated in the attached drawings, and described in the following specification are exemplary embodiments of the inventive concepts defined herein. For purposes of discussion, the drawings are described collectively. Thus, like elements may be commonly referred to herein with like reference numerals and may not be re-introduced. FIG. 1A-2 show schematics of example configurations with relative positioning of the various components. FIG. 3-7 are shown approximately to scale, although other relative dimensions may be used. As used herein, the terms “approximately” is construed to mean plus or minus five percent of the range unless otherwise specified.

Further, FIGS. 1A-7 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. Moreover, the components may be described as they relate to reference axes included in the drawings.

Features described as axial may be approximately parallel with an axis unless otherwise specified. Features described as counter-axial may be approximately perpendicular to an axis unless otherwise specified. Features described as radial may circumferentially surround or extend outward from an axis unless otherwise specified.

Features described as longitudinal may be approximately parallel with an axis that is longitudinal. An axis that is normal to an axis that is longitudinal may be referred to as lateral. Features described as lateral may be approximately parallel with an axis that is lateral or normal to an axis that is longitudinal.

Referring to FIG. 1A, the figure schematically depicts an example of a vehicle 10 with a propulsion system 11 (e.g., electric propulsion system). Propulsion system 11 includes an electric machine 14 (e.g., energy conversion device). The electric machine 14 may be incorporated into an axle of the vehicle 10. The electric machine 14 is controlled via controller 50. In some examples, the vehicle propulsion system 11 may include an internal combustion engine (not shown).

The electric machine 14 is further shown coupled to an energy storage device 16, which may include a battery, a capacitor, inductor, or other electric energy storage device. The electric machine 14 can be operated to absorb energy from vehicle motion and convert the absorbed energy to an energy form suitable for storage by the energy storage device (e.g., provide a generator operation). The electric machine 14 can also be operated to supply an output (power, work, torque, speed, etc.,) to drive wheels 18 (e.g., provide a motor operation). It should be appreciated that the electric machine 14 may, in some embodiments, function only as a motor, only as a generator, or both a motor and generator, among various other components used for providing the appropriate conversion of energy between the energy storage device and the vehicle drive wheels. For instance, the electric machine 14 may include a motor, a generator, integrated starter generator, starter alternator, among others and combinations thereof. The electric machine 14 may also include or be coupled to an inverter. The inverter may be configured to condition electrical energy in and out of the energy storage device (e.g., high voltage battery). However, in other examples, the vehicle may not include an inverter.

The energy storage device 16 may be selectively coupled to an external energy source 19. For example, the energy storage device 16 device may be periodically coupled to a charging station (e.g., commercial or residential charging station), portable energy storage device, etc., to allow the energy storage device 16 to be recharged.

The electric machine 14 is coupled to a torque converter 20. The torque converter 20 is a fluid coupling designed to transfer rotational input from the electric machine 14 to a driveline 22. The driveline 22 includes a transmission with gearing and other suitable mechanical components designed to transfer rotational motion to the drive wheels 18. The drive wheels 18 may be supported by and drive vehicle 10 across a surface 21. The mechanical components may include a gearbox, axles, transfer cases, etc., for example. The torque converter 20 and the electric machine 14 are depicted as an interconnected unit. However, in other examples, the torque converter and the electric machine may include discrete enclosures.

The electric machine 14 may include one or more clutches designed to selectively rotationally couple the machine's rotor to torque converter 20. For instance, the clutch or clutches may each include plates, splines, and/or other suitable mechanical components allowing the machine to be rotationally connected as well as disconnected from the engine or the torque converter.

The depicted connections between electric machine 14, driveline 22, and drive wheel 18 indicate transmission of mechanical energy from one component to another, whereas the connections between the electric machine 14 and the energy storage device 16 may indicate transmission of a variety of energy forms such as electrical, mechanical, etc. For example, torque may be transmitted from the electric machine 14 to drive the vehicle drive wheels 18 via the driveline 22. As described above, the electric machine 14 may be configured to operate in a generator mode and/or a motor mode. In a generator mode, propulsion system 11 absorbs some or all of the output from electric machine 14, which reduces the amount of drive output delivered to the drive wheel 18, or the amount of braking torque to the drive wheel 18. Such operation may be employed, for example, to achieve efficiency gains through regenerative braking, increased engine efficiency (if included), etc. Further, the output received by the electric machine 14 may be used to charge an energy storage device 16. In motor mode, the electric machine 14 may supply mechanical output to the driveline 22, for example by using electrical energy stored in an electric battery. Additionally, an engine may supply rotational output to the driveline 22, in some instances.

The electric machine 14 may also be used to deliver electrical energy to external, auxiliary devices during power take-off. The electric machine 14 may run during power take-off but the drive wheels 18 are not in motion, allowing power output from the electric machine 14 to be directed at least partially towards operating the auxiliary devices. The vehicle 10 may include a power interface 30 arranged along an electrical circuit of the vehicle 10. The power interface may have a plurality of power outlets 32, each outlet electrically coupled to the electric machine, and plugging the auxiliary devices into the plurality of outlets allows power to be supplied to the auxiliary devices. Each of the power outlets 32 are coupled to or have a circuit breaker 34 integrated therein. The arrow extending between the electric machine 14 and the power interface 30 indicates the transfer of electrical energy therebetween. Further details of the power interface are described below, with reference to FIG. 2.

FIG. 1A also shows a controller 50 in the vehicle 10. The controller 50 receives signals from the various sensors of FIG. 1A and employs the various actuators of FIG. 1A to adjust vehicle operation based on the received signals and instructions stored in non-transitory memory of the controller 50. The electric machine, shown in FIG. 2 as a motor generator, may also be controlled by the controller 50. Specifically, controller 50 is shown in FIG. 1A as a conventional microcomputer including: microprocessor unit 52, input/output ports 54, read-only memory 56, random access memory 58, keep alive memory 59, and a conventional data bus. Controller 50 is configured to receive various signals from sensors coupled to the propulsion system 11 and send command signals to actuators in components in the vehicle, such as the electric machine 14. Additionally, the controller 50 is also configured to receive pedal position (PP) from a pedal position sensor 60 coupled to a pedal 62 actuated by a user 64. Therefore, in one example, the controller 50 may receive a pedal position signal and adjust actuators in the electric machine 14 based the pedal position signal to vary the rotational output of the electric machine 14. The sensors communicating with the controller 50 may include an electric machine sensor 68 (e.g., resolver or Hall effect sensor for sensing a rotor position of the electric machine), and wheel speed sensor 70, accelerometer, etc. Additionally, the controller 50 may communicate electronically with one or more mobile applications. For example, a mobile application may enable the user to select stored auxiliary devices to be charged during a planned trip and based upon an electrical load profile stored in memory for the stored auxiliary devices, the mobile application may determine an amount of energy that will be spent during a planned trip. In one example, the controller 50 may include computer readable instructions, that when executed cause the controller 50 to measure an electrical load of one or more auxiliary devices plugged into the power interface and transmit a measurement of the electrical load to the mobile application. In another example, the controller 50 may include instructions that when executed cause the controller 50 to communicate one or more vehicle operating conditions to the mobile application and adjust one or more vehicle operating conditions in response to a command from the mobile application. An example of a mobile application is described in more detail with reference to FIG. 2.

Referring to FIG. 1B, the figure schematically depicts another example of a vehicle 10. The propulsion system 11 in FIG. 1B has an additional component in the form of an engine 72. The engine 72 may be an internal combustion engine. The engine 72 may have an output coupled to the torque converter 20 and may be incorporated into the axle of the vehicle. The engine may be controlled via controller 50. Both the engine 72 and electric machine 14 may act as movers to drive the vehicle 10. Additionally, the vehicle 10 may act as a hybrid vehicle. Wherein rotational energy in the form torque from the engine 72 or other rotational and mechanical energy from components may be converted into electrical energy by the electric machine 14. The energy converted by the electric machine 14 may be stored in the energy storage device 16 such as when in a generator mode or during regenerative braking. The output of the electric machine 14 to the torque converter 20 may act as input for the transfer and transformation of torque into electrical energy during hybrid operations.

As described above, the electric machine 14 of FIG. 1A-B may be an electric motor incorporated into an axle in some examples. An example of an electric motor 202 is depicted in a schematic diagram 200 in FIG. 2, arranged in a vehicle 204. As one example, the electric motor 202 may be the electric machine 14 and the vehicle 204 may be the vehicle 10 of FIG. 1A-B. The electric motor 202 may be arranged between an electric energy storage device 206 and a transmission 208 in a front end 213 of the vehicle 204. The transmission 208 may be or incorporate the torque converter 20 of FIG. 1A-B.

The vehicle 204 may also have a power interface 212 which may be disposed in a vehicle bed 218, as shown in FIG. 2. However, in other examples, the power interface 212 may be positioned in some other, accessible region of the vehicle 204. The power interface 212 includes an optional digital display 215 to display information about a status of the power interface 212, e.g., to indicate active power draw through the power interface 212, an overall current flow through the power interface 212, etc. The power interface 212 has a plurality of power outlets 214 configured to receive electrical plugs of electrical devices, such as an auxiliary device 216. The auxiliary device 216 may be coupled to one of the plurality of power outlets 214 by a power cable 220 that is plugged into the power outlet at a first end 224 and connected to the auxiliary device 216 at a second end 226. By plugging the auxiliary device 216 into one of the plurality of power outlets 214, power may be delivered to the auxiliary device 216 from the electric motor 202. In one example, the auxiliary device 216 may include a rechargeable battery that is charged via the power interface 212. The auxiliary device 216 may be used when detached from the power interface 212. In another example, the auxiliary device 216 may be ran directly off the power interface 212 and used while plugged in. Although a single auxiliary device is shown plugged into the plurality of power outlets 214 in FIG. 2, other examples may include more than one auxiliary device coupled to the plurality of power outlets 214 and drawing power from the electric motor 202.

Each of the plurality of power outlets 214 may be equipped with a circuit breaker 203, as shown in insert 205. The circuit breaker 203 may be adapted to interrupt electrical flow through each of the plurality of power outlets 214 when triggered by current flow through the power interface 212 rising above a threshold such as 30 or 40 amps. The circuit breaker 203, arranged in a closed position when the auxiliary device 216 is operating, may be tripped when the current level reaches the threshold and switched to an open position to cut off power supply to the associated outlet of the plurality of power outlets 214 and deactivate the auxiliary device 216. In order to restart the auxiliary device 216, the tripped circuit breaker is reset by switching the circuit breaker back to the closed position. The circuit breaker may be a transistor with current-sensing capability. Therefore, in such an example, the breaker may be manually reset via user action and completed electronically.

A powertrain control module (PCM) 210 may be included, for example, in the controller 50 of FIG. 1A-B. The PCM 210 receives information from sensors arranged in a powertrain of the vehicle 204 and sends instructions to actuators of the powertrain. For example, the PCM 210 may receive a signal from a resolver of the electric motor 202 to infer a power output of the electric motor 202 and command adjustment of electric motor 202 output, e.g., field current, according to active motor operations and electrical loads. The PCM 210 may also control activation of vehicle accessories such as headlights 230, taillights 232, positioned at the front end 213 and a rear end 234 of the vehicle 204, respectively, a speaker or horn 236, and a cabin display panel 238. As such, illumination of the headlights 230 and taillights 232 may be enabled by the PCM 210 as well as emission of noises by the horn 236 and presentation of alerts and notifications at the cabin display panel 238.

The PCM 210 may also communicate with the power interface 212 and the auxiliary device 216 through a communication link. The communication link may be a wireless communication network, such as a Bluetooth low energy (BLE) network, allowing the PCM 210 to monitor electrical and operating statuses of power interface 212 and the auxiliary device 216. For example, the vehicle PCM 210, the plurality of power outlets 214, and the auxiliary device 216 may be equipped with BLE antennae 207, allowing wireless communication between each of the components and between the PCM 210 and an external communication device, such as a mobile phone, or another electronic device. In other examples, the communication link may be a wired communication link such as a programmable logic controller (PLC) communication link established via the electrical lines coupling the power outlet where the auxiliary device is attached to the PCM. A communication or electronic device may be similarly adapted to connect to the PCM 210 via a communication link and may be controlled by the user. The communication link established between the communication or electronic device and the PCM 210 may be similar, in one example, to the communication link between the PCM and the auxiliary devices. However, in other examples, the communication links may be dissimilar. For instance, the PCM may establish a PLC communication link with the auxiliary devices and a wireless communication link with the mobile phone. The load to charge the auxiliary device can be measured by the PCM 210 or input by the user. For example, the PCM 210 may automatically pair with an auxiliary device that is plugged into the vehicle power outlets, allowing the PCM to detect the item power rating and/or the size of a rechargeable battery and store as a device profile in the mobile application. The device profile may be stored and retrieved at a later time. For example, the user may create a use profile by selecting one or more device profiles along with user preferences. The use profile may include the selected devices and other conditions, such as, how many times the user will recharge the selected devices, charge rate, and so on. In one example, the use profiles may be used to predict whether the desired usage will leave the EV enough charge to transport the user. As another example, the use profiles may be used to predict how long the user may charge the device given real-time operating conditions, such as battery state of charge (SOC), ambient conditions at a destination, etc. The user may decide whether to proceed as planned based on the prediction. As another example, the user may select a use profile from stored use profiles and, in response, the PCM 210 may monitor auxiliary device charging in real time. The PCM 210 may generate updates for the user in response to the use profile using more charge than predicted.

A set of reference axes 301 are provided for comparison between views shown in FIGS. 3-7. The reference axes 301 indicate a y-axis, an x-axis, and a z-axis. In one example, the z-axis may be parallel with a direction of gravity and the x-y plane may be parallel with a horizontal plane that an assembly 302, an assembly 402, and a rotor core 702 may rest upon. When referencing direction, positive may refer to in the direction of the arrow of the y-axis, x-axis, and z-axis and negative may refer to in the opposite direction of the arrow of the y-axis, x-axis, and z-axis. A filled circle may represent an arrow and axis facing toward, or positive to, a view. An unfilled circle may represent an arrow and an axis facing away, or negative to, a view.

Turning to FIG. 3, a first view 300 is shown of an assembly 302. The assembly 302 may be formed of passages, volumes, and other components that a fluid may flow through. The first view 300 may be a side view, wherein no axis is shown favoritism. The assembly 302 in FIG. 3 may be surrounded and formed from the volumes of other components and may be shown with components enclosed by other features. The assembly 302 may be located between a first side 304 and a second side 306. The first side 304 may be located a first end of the assembly 302, and the second side 306 may be located at a second end of the assembly 302 opposite to the first end. The assembly 302 may be centered about an axis 308. Axis 308 may act as a longitudinal axis for the assembly 302. A plane 310 parallel and collinear with the axis 308 may divide the assembly 302 into two approximately symmetrical halves.

The assembly 302 may be defined by the shaft section 312 and a cooling network 314. The cooling network 314 may be located about the shaft section 312. The cooling network 314 may be located radially about the shaft section 312 with respect to the axis 308.

The shaft section 312 may be formed of a volume enclosed by a shaft. The shaft section may be formed of an inner body 320. The inner body 320 may be formed to the volume of a channel enclosed by a shaft. The channel enclosed by the inner body 320 may house a fluid that may be used as a cooling medium or coolant, such as oil. Cooling fluid may be enclosed in the inner body 320. The inner body 320 may have an inlet face 322 from which coolant may enter from a feed source. The inlet face 322 may be formed from a cut plane where the inner body 320 may interface with another component, such as a feed source, that may fluidly couple to the inner body 320 to supply the coolant.

Fluid, such as coolant, may travel radially outward from the inner body 320, shaft section 312, and components of the cooling network, with respect to the axis 308. Fluid, such as coolant, may also travel in a first direction 316 or a second direction 318. The first direction 316 and second direction 318 may be approximately axial with respect to the axis 308. The first direction 316 may extend toward the first side 304. The second direction 318 may extend toward the second side 306. The first direction 316 and second direction 318 may act as directions for fluid to flow, or flow directions, for fluid in the assembly 302.

The cooling network 314 may be formed by a plurality of passages supported by a first ring **328*a* and a second ring 328*b*. The first ring 328*a* and second ring 328*b* may be volumes located on opposite ends of the cooling network 314. For example, the first ring 328*a* may be located on the first side 304 and the second ring 328*b* may be located on the second side 306 of the cooling network 314. Fluid, such as coolant may move through the first ring 328*a* and second ring 328*b***.

The first and second rings **328*a*, 328*b* of the cooling network 314 may support and be connected to a plurality of first outer passages 324*a* and a plurality of second outer passages 324*b*. The first and second rings 328*a*, 328*b* may also support a plurality of first inner passages 326 and a plurality of second inner passages 327. The first inner passages 326 and second inner passages 327 may be formed against the surface of a shaft that may surround inner body 320. The first inner passages 326 may be fluidly coupled to the first outer passages 324***a* via the first ring 328*a*. The first inner passages 326 may be fluidly coupled to the second outer passages 324*b* via the second ring 328*b*. The first outer passages 324*a* and second outer passages 324*b* may be positioned approximately equidistant from one another. The first and second outer passages 324*a*, 324*b* may be positioned radially about the other features of the cooling network 314, with respect to axis 308. The first inner passages 326 and second inner passages 327 may be positioned radially about the shaft section 312. The first inner passages 326 and second inner passages 327 may be positioned radially within the first and second outer passages 324*a*, 324*b*, with respect to axis 308.

The first inner passages 326 may be approximately equidistant from one another. The second inner passages 327 may be approximately equidistant from one another. The first and second inner passages 326, 327 may be approximately equidistant from one another.

Each of the first outer passages 324*a* may be fluidly coupled to a first connector 330*a* and a first port 332*a*. Each of the second outer passages 324*b* may be fluidly coupled to a second connector 330*b* and a second port 332*b*. There may be a plurality of first and second connectors 330*a*, 330*b* located radially about the axis 308. Some of the second inner passages 327 be fluidly coupled to a third port 334. There may be a plurality of third ports 334 that extend radially from first ring 328*a* and the second inner passages 327, with respect to axis 308

Each of the first inner passages 326 may be fluidly coupled to the inner body 320 via at least one of a plurality of passages 340. The passages 340 may be the volumes of radial holes that extend radially through the shaft forming the inner body 320. The first connectors 330*a* may be volumes that fluidly couple the first inner passages 326 and first ring 328*a* to the first outer passages 324*a*. Each of the first inner passages 326 may fluidly couple to each of the first outer passages 324*a* via at least a one of the first connectors 330*a*. The second connectors 330*b* may be volumes that fluidly couple a first inner passages 326 and second ring 328*b* to the second outer passages 324*b*. Each of the first inner passages 326 may fluidly couple to each of the second outer passages 324*b* via at least a one of the second connectors 330*b*. The first connectors 330*a* may be positioned on an opposite side of the cooling network from the second connectors 330*b*. For one example, the first connectors 330*a* may be closest to the first side 304 and the second connector 330*b* may be closest to the second side 306 of the assembly 302. The first ports 332*a* may be positioned on an opposite side of the cooling network from the second ports 332*b*. For one example, the first ports 332*a* may be closest to the second side 306 and the second ports 332*b* may be closest to the first side 304 of the assembly 302.

Fluid, such as coolant, may be driven by centripetal force through the assembly 302. Fluid, such as coolant, may originate at the inlet face 322 and fill the volume of the inner body 320. Centripetal force from the rotation of the assembly 302, may drive fluid radially away from the inner body 320 via the passages 340 into the cooling network 314. Fluid may enter the passages 340 from the inner body 320, and enter the first inner passages 326 via the passages 340. Each of the first inner passages 326 may be fluidly coupled to at least one of the passages 340. Fluid flow in the first inner passages 326 may be approximately split evenly in volume and mass to travel axially, with respect to the axis 308, in the first direction 316 or the second direction 318 through each of the first inner passages 326. Fluid traveling in the first direction 316 through the first inner passages 326 may travel toward and enter the volume of the first ring 328*a*. Fluid traveling in the second direction 318 through the first inner passages 326 may travel toward and enter the volume of the second ring 328*b*.

Fluid may exit the volume of the first ring 328*a* via the first connectors 330*a*. Fluid may exit the volume of the second ring 328*b* via the second connectors 330*b*. Fluid in the volume of first ring 328*a* may also enter the second inner passage 327 and/or the third ports 334.

Fluid may enter the first outer passages 324*a* via the first connectors 330*a* from the first inner passages 326 and first ring 328*a*. The first connectors 330*a* may change the direction of the fluid from traveling in the first direction 316 to traveling in the second direction 318. Fluid may travel axially, with respect to axis 308, in the second direction 318 through the first outer passages 324*a* until exiting through the first port 332*a*. Likewise, fluid may enter the second outer passages 324*b* via the second connectors 330*b* from the first inner passages 326 and second ring 328*b*. The second connectors 330*b* may change the direction of the fluid from traveling in the second direction 318 to traveling in the first direction 316 through the second outer passages 324*b*. Fluid may travel in the second direction 318 through the second outer passages 324*b* until exiting through the second port 332*b*. Coolant exiting the first outer passages 324*a* and second outer passages 324*b* via the first and second ports 332*a*, 332*b*, respectively, may be splashed onto features of the electric machine, such as the end windings of a stator.

Turning to FIG. 4, a second view 400 of a section of an assembly 402 is shown. The second view 400 may be an isometric view and shows the assembly 402 when sectioned. The assembly 402 is a shaft assembly comprised of a rotor shaft 408 coupled to a first plate 412*a* and a second plate 412*b*. The assembly 402 may be sectioned into a half via the plane 310. Assembly 402 may include the volumes of assembly 302 with reference to FIG. 3.

The first plate 412*a* and second plate 412*b* may be located about and drivingly coupled to the rotor shaft 408. The rotor shaft 408, first plate 412*a*, and second plate 412*b* may be aligned when coupled, such that the rotor shaft 408, first plate 412*a*, and second plate 412*b* may be centered about the axis 308. The rotor shaft 408 may act as a shaft, and may form or be drivingly coupled to an output for an electric machine. The first plate 412*a* and second plate 412*b* may act as end plates for the assembly 402 and rotor shaft 408.

The rotor shaft 408 may be hollow, partially enclosing a channel 410. The channel 410 may be located about and form a portion of the inner body 320 and the shaft section 312 of FIG. 3. The first plate 412*a* and second plate 412*b* may be located at opposite ends of the rotor shaft 408. For one example, the first plate 412*a* may be about the rotor shaft 408 nearer to the second side 306 and the second plate 412*b* may be located nearer to the first side 304. Volumes of the cooling network 314, such as the second ring 328*b* and second connectors 330*b* may be formed from features of the first plate 412*a*. Likewise, volumes of the cooling network 314, such as the first ring 328*a* and first connectors 330*a* may be formed from features of the second plate 412*b*.

The first plate 412*a* may be of a first outer diameter 414*a* and a first inner diameter 415*a*. The second plate 412*b* may be of a second outer diameter 414*b* and a second inner diameter 415*b*. The first and second plates 412*a*, 412*b* may share different or similar dimensions for an example of an embodiment. For example, the first outer diameter 414*a* and second outer diameter 414*b* may be of the same distance. For this and other examples, the first inner diameter 415*a* and second inner diameter 415*b* may be of the same distance. For another embodiment, the first and second plates 412*a*, 412*b* may be the same plates.

A fastener 416, such as a nut, may secure the first plate 412*a* and first ring 328*a* in a position to abut and fluidly couple to the cooling network 314. A shield 418 may be located axially nearer to the second side 306 from the fastener 416, with respect to axis 308. Both the fastener 416 and shield 418 may prevent the first plate 412*a* from moving axially toward the first side 304, with respect to the axis 308.

A shoulder 420 may prevent the second plate 412*b* from moving axially toward the first side 304, with respect to the axis 308. The shoulder 420 may be ring like and extend radially from the rotor shaft 408, with respect to the axis 308. The shoulder 420 may have a surface 421 that is approximately flat and extends radial with respect to axis 308. The surface 421 may abut and be in surface sharing contact with the second plate 412*b*. The cooling network 314 may be located radially about the rotor shaft 408 and axially between the first plate 412*a* and second plate 412*b*, with respect to the axis 308.

The rotor shaft 408 has an outer surface 422 and an inner surface 424. The channel 410 may be formed from the inner surface 424. The outer surface 422 inner surface 424 may have a plurality of diameters. About the channel 410 of the rotor shaft 408, the opposite sides of the outer surface 422 may be separated by a first outer diameter 426. When bounded by the channel 410 of the rotor shaft 408, opposite sides of the inner surface 424 may be separated by a first inner diameter 428. There may be a plurality of inner and outer diameters of distances different from the first inner diameter 428 and first outer diameter 426, respectively, near regions at opposite ends of the rotor shaft 408.

The rotor shaft 408 may have a first mouth 432 and a second mouth 434. The first mouth 432 for example may be axially nearest to the second side 306 and the second mouth 434 may be axially nearest to the first side 304, with respect to the axis 308. Coolant, such as oil, may enter the channel 410 via the first mouth 432 or second mouth 434 from a transmission. For the example shown in assembly 402 coolant may enter channel 410 via the second mouth 434.

A first region of the outer surface 422 about the first mouth 432 may be of a second outer diameter 438. A second region of the outer surface 422 about the first mouth 432 may be of a third outer diameter 440. The first section of the outer surface 422 of the second outer diameter 438 may be axially, with respect to the axis 308, closer to the channel 410 than the second section of the outer surface 422 of the third outer diameter 440. The first mouth 432 may be of a second inner diameter 444.

The second mouth 434 may have section that is of a fourth outer diameter 442. The diameter between the section of the second mouth 434 with the fourth outer diameter 442 and the shoulder 420 may be variable. The outer diameter of the second mouth 434 may increase from a fourth outer diameter 442 to a fifth outer diameter 443 in the first direction 316 toward surface 421. The expansion of the diameter of the second mouth 434 forms the shoulder 420. A portion of shoulder 420 may be a fifth outer diameter 443. The fifth outer diameter 443 may be where the diameter of the shoulder 420 and shaft 408 are at a maximum. For other embodiments the second mouth 434 may have a plurality of other sections of outer diameters similar to first mouth 432.

The second mouth 434 may have a third inner diameter 446. The second mouth 434 may have a plurality of teeth 448 within the third inner diameter 446. The teeth 448 may be positioned radially about axis 308 on the inner surface of the second mouth 434. The teeth 448 have lengths that are axial with respect to the axis 308. The teeth 448 may be complimentary with the teeth of an output or an appendage. When meshed the teeth 448 and teeth of an output or appendage may drivingly couple the shaft 408. The shoulder 420 may provide mechanical support to the second mouth 434 and other portions of the rotor shaft 408 when coupled to an output or appendage. Forces affecting the second mouth 434 may be distributed radially about the shoulder 420, with respect to axis 308.

The first inner diameter 428 of the inner surface 424 may decrease in distance into the second inner diameter 444 at positions located axially, with respect to the axis 308, between the channel 410 and the first mouth 432. The decrease of the first inner diameter 428 into the second inner diameter 444 may form a first variable surface 450*a*. Likewise, the first inner diameter 428 of the inner surface 424 may decrease in distance into the third inner diameter 446 at positions located axially, with respect to the axis 308, between the channel 410 and the second mouth 434. The decrease of the first inner diameter 428 into the third inner diameter 446 may form a second variable surface 450*b*. For one example, the first and second variable surfaces 450*a*, 450*b* may be conical in shape. For another example, the first and second variable surfaces 450*a*, 450*b* may be of another shape such as concave.

A plurality of holes 452 may extend through the material of the first and second plates 412*a*, 412*b*. The holes 452 of the first plate 412*a* may fluidly couple to the second ports 332*b*. The holes 452 of the second plate 412*b* may fluidly couple to the first ports 332*a*.

For one example, fluid exiting the first ports 332*a* may be ejected axially, with respect to the axis 308, through the holes 452 of the second plate 412*b*. For this example, fluid may exit holes 452 of the second plate 412*b* in the first direction 316. For another example, fluid exiting the second ports 332*b* may be ejected axially, with respect to the axis 308, through the holes 452 of the first plate 412*a*. For this example, fluid may exit holes 452 of the first plate 412*a* in the second direction 318. The holes 452 may therein act as drain holes. Fluid expelled from the first ports 332*a* and second ports 332*b* through holes 452 may be a coolant, such as an expelled oil.

The holes 452 on the first plate 412*a* and holes 452 on the second plate 412*b* may alternate in position radially, with respect to axis 308. For one example the holes 452 on the second plate 412*b* may correspond with the radial positions, with respect to axis 308, of the second outer passages 324*b* and second ports 332*b*. For this example, the holes 452 on the first plate 412*a* may correspond with the radial positions, with respect to axis 308, of the first outer passages 324*a* and first ports 332*a*. The first outer passages 324*a* and first ports 332*a* alternate with and are located radially, with respect to the axis 308, between the second outer passage 324*b* and second ports 332*b*. The holes 452 on the first plate 412*a* and second plate 412*b* may therein act as alternating drain holes with respect to one another.

Additionally, a plurality of volumes of first and second connectors 330*a*, 330*b* may be formed of channels in each end plate. For an example of one embodiment, the second connectors 330*b* may be formed channels that are inclined, extending diagonally and radially, with respect to the axis 308. The channels forming the second connectors 330*b*, may be formed in a surface 454*a* of the first plate 412*a* and may be referred to herein as incline channels. For this example, the first connectors 330*a*, may be formed from channels that are inclined, extending diagonally and radially, with respect to the axis 308. The channels forming the first connectors 330*a*, may be formed in a surface 454*b* of the second plate 412*b* and may be referred to as inclined channels. The inclined channels formed on the first surface 454*a* and second surface 454*b* may act as alternating channels, wherein the inclined channels on the first surface 454*a* and second surface 454*b* may alternate positions radially with respect to axis 308. For example, an incline channel on the first surface 454*a* may be located on a first axis adjacent to a second axis of an incline channel on the second surface 454*b*, wherein the first axis and second axis are radial with respect to the axis 308.

Components may also redirect fluid, such as lubricant, ejected from holes 452. For example, the shield 418 may redirect fluid traveling in an axial direction, with respect to axis 308, from the first ports 332*a* and holes 452 on the first plate 412*a*. The shield 418 may redirect fluid in a more radial direction, with respect to axis 308, toward other components of the electric machine, such as stator end windings.

The passages 340 may extend through the outer surface 422 to the inner surface 424. passages 340 may couple a plurality of first inner passages 326 to the channel 410. A plane 425 may be positioned at the approximate location of the middle of shaft 408 between the first and second plates 412*a*, 412*b*. The passages 340 may be approximately coplanar with a plane 425. The passages 340 may therein be located radially about a middle and an approximate center of the shaft 408 between the first and second plates 412*a*, 412*b*. Passages 340 may feed fluid, such as coolant, such as oil, from the channel 410 to the first inner passages 326.

The first and second inner passages 326, 327 may abut the outer surface 422. The first and second inner passages 326, 327 may be positioned radially about the outer surface 422 with respect to the axis 308. The first inner passages 326 may be of a length 456. Likewise, the first and second outer passages 324*a*, 324*b* may be of approximately the length 456, traversing a majority of the axial length of the rotor shaft 408. The first and second outer passages 324*a*, 324*b* may traverse a distance between the first surface 454*a* and second surface 454*b*. The second inner passages 327 may be of a length 458. Length 456 and length 458 may be axial with respect to the axis 308, and therein each may be an axial length.

The rotor cooling network 314 may be fluidly coupled to the first plate 412*a* and outer surface 422 via a first clip 462. The first clip 462 may be formed of the second ring 328*b*. The first clip 462 may extend into a groove 464 located radially about and into the outer surface 422, with respect to the axis 308. Groove 464 may be located nearest to the first mouth 432 with respect to the axis 308. The first clip 462 may also extend into and abut a shoulder 466 formed on the first plate 412*a*. The second ring 328*b* and the first clip 462 may be located radially between the first plate 412*a* and the outer surface 422, with respect to axis 308. Fluid, such as coolant, may travel about the first clip 462.

Fluid such, such as coolant, from the first ring 328*a* and second ring 328*b* may be multi-purpose having other functions, such as a lubricant. Coolant as a lubricant may provide lubrication for the first and second plates 412*a*, 412*b*, respectively. Lubricant of the second ring 328*b* may drip across the surface 454*a*. The surface 454*a* may be rotor core facing surface. The lubricant in the second ring 328*b* and on surface 454*a* may reduce friction between and remove thermal energy from the first plate 412*a* and a rotor core. The rotor core may be located axially between the first and second plates 412*a*, 412*b*, with respect to axis 308. The surface 454*b* on the second plate 412*b* may be similar in dimension and function to surface 454*a*, and may be lubricated by the first ring 328*a*. The lubricant in the on surface 454*b* and in the first ring 328*a* may reduce friction between and remove thermal energy from the second plate 412*b* and the rotor core located axially, with respect to axis 308, between the first and second plates 412*a*, 412*b*.

The rotor cooling network 314 may be fluidly coupled to the second plate 412*b* and outer surface 422 via a second clip 472. The second clip 472 may be formed of the first ring 328*a*. The second clip 472 may extend radially about a land 474 of the second plate 412*b*, with respect to the axis 308. Groove 464 may be located nearest to the second mouth 434 with respect to the axis 308. The first ring 328*a* and the second clip 472 may be located radially between the second plate 412*b* and the outer surface 422, with respect to axis 308. Fluid, such as lubricant and coolant fluid, may travel through or be enclosed by the second clip 472.

A first land 482 and a second land 484 may be located radially about the first mouth 432, with respect to the axis 308. The first land 482 may be of the second outer diameter 438 and form the first section of the first mouth 432. The second land 484 may be of the third outer diameter 440 and form the second section of the first mouth 432. The second land 484 may be closer axially to the first side 304 compared to the first land 482.

Turning to FIG. 5, a third view 500 is shown of the shaft 408. The third view 500 may be an isometric view, wherein no favoritism is shown to an axis. The shaft 408 in third view 500 may be isolated from other components of a rotor core and the assemblies 302, 402.

There may be a plurality of grooves with lengths positioned axially with respect to axis 308 and form depressions in the outer surface 422 of the rotor shaft 408. For an example of one embodiment, there be a plurality of first grooves 510 and a plurality of second grooves 512. The first and second grooves 510, 512 may terminate at a shoulder 514 near the nearest the first mouth 432. The first and second grooves 510, 512 may be positioned radially about the rotor shaft 408 and form depressions into the outer surface 422.

At the shoulder 420 each of the second grooves 512 has an extension 516. There may be a plurality of extensions 516. The plurality of extensions 516 changes directions from longitudinal to lateral, and/or axial to counter axial, with respect to axis 308. The extensions 516 may extend in a radial direction from the axis 308 and terminate at the outer surface 518 of the shoulder 420. The each of extensions 516 may form an indentation in the surface 421. Surface 421 may be formed of shoulder 420 and extend radially from the outer surface 422, with respect to the axis 308. The extensions 516 may be located radially about the shoulder 420 with respect to the axis 308. For one example, there may be two extensions 516 equidistant from one another and on opposite sides of the axis 308. In addition to the extensions 516, a plurality of notches 522 may extend radially about and into the material of the shoulder 420. Notches 522 may form depressions into the outer surface 518. The extensions may partially form the volumes of the third ports 334 with reference to FIG. 3.

The first grooves 510 may be of a first length 524 and the second grooves 512 may extend a second length 526. The first and second lengths 524, 526 may be approximately axial to axis 308. The first and second lengths may be longitudinal with respect to the longitudinal axis of the shaft 408. The second length 526 may be a greater distance than the first length 524.

FIG. 5 shows there may be a single or plurality of additional lands about the first mouth 432 compared to the shaft 408 of FIG. 4. The number of lands about the first mouth 432 may be non-limiting. For example, a third land 528 may be located axially between the second land 484 and first side 304. The third land 528 may be located radially about the first mouth 432 with respect to the axis 308. The third land 528 be of a sixth outer diameter 530.

A plurality of holes 532 may be located radially about the rotor shaft 408, with respect to axis 308. The holes 532 may extend through the material of the rotor core between the outer surface 422 and inner surface 424, with reference to FIG. 4. Passages 340 may extend through holes 532 to fluidly couple the channel 410 to the first inner passages 326. The holes 532 may be approximately coplanar with a plane 425. The holes 532 may therein be located radially about the approximate middle and center of the shaft 408 between the first and second plates 412*a*, 412*b*.

Turning to FIG. 6, it shows a fourth view 600 of a plate 602 isolated from the other features of the rotor shaft 408. Fourth view 600 may be an isometric view, wherein no favoritism is shown to an axis. The plate 602 may be an embodiment of the first plate 412*a* or second plate 412*b*, with reference to FIG. 4. Features on plate 602 may be shared with the first plate 412*a* or second plate 412*b*. Plate 602 may be centered on an axis 608. Axis 608 may be parallel or collinear with axis 308, with reference to FIG. 3-4.

Plate 602 has a hole 606 that may be located and centered about axis 608. Plate 602 has a first surface 610 located on top with respect to the fourth view 600. The surface 610 may abut a surface of a different component; such as surface 421 of the shoulder 420 or a surface of fastener 416. The surface 610 incorporates holes 452, found in the first plate 412*a* and second plate 412*b*. Fluid may be passed through the holes 452 to a second surface 612 on the opposite side of plate 602. The surface 612 may be located below surface 610.

The first surface 610 may be formed on a first land 614. The second surface 612 may be formed axially below a second land 616, with respect to the axis 608. The second land 616 may be located axially between a first groove 618 and a second groove 620, with respect to axis 608. The first groove 618 may be located axially between the first land 614 and second land 616, with respect to the axis 608.

The first land 614 may be of a first diameter 622. The second land 616 may be of a second diameter 624.

The plate 602 may have a first inner surface 632 and a second inner surface 634. The first inner surface 632 and the second inner surface 634 may be radial with respect to the axis 608 and vertical with respect to fourth view 600. The first inner surface 632 may define a first inner diameter 636 of the plate 602. The second inner surface 634 may define a second inner diameter 638 of the plate 602.

The plate 602 may have a plurality of channels 642 located in the material of the first inner surface 632. The channels 642 may form indentations in the material of the first surface 610. Channels 642 may be positioned approximately equidistant from one another about the first inner surface 632. Each of the channels 642 may be offset from a tangent line 646 formed on the circumference of the first inner surface 632. Each of channels 642 may be offset from a respective tangent line 646 by a distance 648. The channels 642 may form from and extend tangentially with respect to the circumference of the first inner surface 632. Each of the channels 642 may extend tangentially in a same rotational direction. The number of channels 642 may be dependent on the number of outer passages, such as first or second outer passages 324*a*, 324*b*, and inner passages, such as the first inner passages 326, that may be fluidly coupled. There may be at least one of channels 642 for each of the first inner passages 326. For an example of one embodiment shown in FIG. 6, there may be four of channels 642.

Each of channels 642 may be fluidly coupled to the hole 606 via a mouth 644. Each of the mouths 644 may be wider than the channels 642. The hole 606 may be fluidly coupled to inner channels, such as first inner passages 326, when the plate 602 is coupled to the rotor shaft 408. Likewise, the outer passages, such as the first and second outer passages 324*a*, 324*b*, may be fluidly coupled to the channels 642. The channels 642 may be angled as to extend inclined toward the first outer passages 324*a* or the second outer passages 324*b* from the hole 606. The channels 642 may deliver coolant to every other passage, such as the first or second outer passages 324*a*, 324*b*, and every other magnetic pole of a rotor core. The channels 642 may be the incline channels described previously with respect to FIG. 4. Each of the channels 642 may form a volume for a connector between an inner passage and an outer passage. For example, the channels 642 may form the first connectors 330*a* between the first inner passages 326 and the first outer passages 324*a*. For another example, the channels 642 may form the second connectors 330*b* between the first inner passages 326 and the second outer passages 324*b*. Centripetal force may drive fluid outward from the inner passages, such as the first inner passages 326, to the outer passages of the rotor cooling network 314, such as the first and second outer passages 324*a*, 324*b*, via the mouths 644 and channels 642, respectively. The surface 610 may prevent fluids from traveling axially past the plate 602 with respect to axis 608.

The hole 606 may couple to and be located about a rotor shaft, such as the rotor shaft 408 with reference to FIG. 4. The first and second inner surfaces 632, 634 may be in surface sharing contact with the outer surface of a rotor shaft, such as the outer surface 422 with reference to FIG. 4. The first inner surface 632 and second inner surface 634 may have a plurality of fasteners 652. The fasteners 652 may be the first clip 462 or the second clip 472 with reference to FIG. 4. For example, there may be two fasteners 652 for each plate 602. However, the quantity of fasteners may be dependent on the number of complementary surfaces or other features are coupled to or formed from the rotor shaft 408.

For an example of one embodiment, each of the fasteners 652 may comprised of plurality of indentations 654, a first rib 656, and a second rib 658. The first and second ribs 656, 658 may be located between at least a pair of indentations 654. The first rib 656 may be located axially above the second rib 658, with respect to the axis 608. The second rib 658 may be closer radially to the axis 608 compared to the first rib 656. The first and second ribs 656, 658 and the indentations 654 may couple with complimentary features formed from or joined to the outer surface 422.

Turning to FIG. 7, it shows a fifth view 700 of a rotor core 702. The fifth view 700 may be a side view, wherein no favoritism is shown to an axis. The rotor core 702 may be comprised of a housing 704 located about a cavity 706. The rotor core 702 and housing 704 may be approximately cylindrical in shape. Likewise, the cavity 706 may be of an approximately cylindrical volume with a diameter 707.

The housing 704 and cavity 706 may form a surface 712 located about the axis 708. The housing 704 may be comprised of a plurality of laminations 710. For example, each layer of the laminations 710 may be formed of steel, such as silicon steel or cold rolled steel. For another example each layer of the laminations 710 may be formed of a steel alloy, such as a nickel or cobalt alloy. Each of the laminations 710 may be aligned such that the resulting housing 704 and cavity 706 may be approximately centered about the axis 708. The axis 708 may be collinear with axis 308, with reference to FIG. 3-4. The laminations may form surface 709 for the housing 704. Surface 709 may be an outer surface that may be located radially about the housing 704.

The Diameter 707 may be approximately the same or larger compared to the first outer diameter 426, such that the housing 704 may be located about the rotor shaft 408. When the housing 704 and cavity 706 are about the rotor shaft 408, the surface 712 may be in surface sharing contact with outer surface 422. The surface 712 may have a plurality of indentations 714 spaced approximately radially and equidistantly about the central axis 708. The indentations 714 may partially enclose and support inner passages, such as the first inner passages 326 and second inner passages 327. A plurality of ridges 716 may be raised from the surface 712. The ridges 716 may be located radially about and be raised in a radial direction toward axis 708. The ridges 716 may be used to drivingly couple a shaft, such as rotor shaft 408, to the housing 704 and rotor core 702. Each of the laminations 710 bay be assembled to form section of the housing 704 with a plurality of ridges 716, and the section may be engaged with notches or grooves on a rotor shaft, such as rotor shaft 408.

The laminations 710 may form surface 719 for the housing 704. Surface 719 may extend radially from the cavity 706, with respect to the axis 708. The surface 719 may be approximately flat. Surface 719 may be positioned to face a core facing surface of a plate, such as first surface 454*a* or second surface 454*b* with reference to FIG. 4.

The laminations 710 and housing 704 may form a plurality of first holes 720 and second holes 724 on surface 719. The first holes 720 and second holes 724 may be located radially about the cavity 706 with respect to axis 708. The first holes 720 and second holes 724 may extend axially, with respect to axis 708, from surface 719 to a surface on the opposite end of the rotor core 702. The first holes 720 and second holes 724 may be approximately the same dimensions; however, the first holes 720 may house or form a different outer passage from the second holes 724. For one example of, the first holes 720 may house or form the first outer passages 324*a*, and the second holes 724 may house or form the second outer passages 324*b*. For this example, the first outer passages 324*a* may act as a set of first passages for cooling the rotor core 702. Additionally, the second outer passages 324*b* may act as a second set of passages for cooling the rotor core 702. For another example, the first holes 720 may house or form the second outer passages 324*b*, and the second holes 724 may house or form the first outer passages 324*a*. The first and second holes 720, 724 may be approximately equidistant from one another. The first holes 720 and second holes 724 may be located about a diameter 718.

A surface 722 may be formed by the first holes 720 and a surface 726 may be formed by the second holes 724. The surface 722 and surface 726 may be shaped to the shape of the first outer passages 324*a* and second outer passages 324*b*. The first holes 720 and second holes 724 form a plurality of channels to transport coolant, such as oil. For these examples, the first holes 720 and second holes 724 may be approximately axial, with respect to axis 308, and therein may form a plurality of axial channels, such as plurality of axial oil channels. For an example of an embodiment, the first holes 720 and second holes 724 may house or form the first outer passages 324*a* and second outer passages 324*b*, respectively. For an example of another embodiment, the first holes 720 and second holes 724, may house or form the second outer passages 324*b* and first outer passages 324*a*, respectively.

For one example the sectional area of the first holes 720 formed by the boundary of the surface 722 form a triangular shape with beveled corners that are smooth. For this example, the sectional area of the second holes 724 may be approximately the same in dimensions as the first holes 720.

The first holes 720 and second holes 724 may be positioned to alternate in sequence in a clockwise or counter clockwise direction radially with respect to axis 308. For example, after a first hole 720 may be a second hole 724 in the next position radially about the cavity 706.

Located radially outward from the first holes 720, are a plurality of magnetically charged poles. There may be a plurality of first poles 728 of a first charge and a plurality of second poles 730 of a second charge. For an example, the first poles 728 may be positively charged and the second poles 730 may be negatively charged. For another example the first poles 728 may be negatively charged and the second poles 730 may be positively charged. The first and second poles 728, 730 may be enclosed by an ellipsis formed of dashes. The first poles 728 and second poles 730 may be formed by permanent magnets. The rotor core 702 may therein be an IPM, such as an interior permanent magnet electric motor.

The first poles 728 and second poles 730 may be positioned such that each adjacent pole, located radially about the axis 708, may be of a different charge. The first poles 728 and second poles 730 may be positioned to alternate in sequence in a clockwise or counter clockwise direction radially, with respect to axis 708. For example, after a first pole 728 may be a second pole 730 in the next position radially about the cavity 706. Each of the first poles 728 may be located partially between one of the first holes 720 and one of the second holes 724. Likewise, each of the second poles 730 may be located between one of the first holes 720 and one of the second holes 724. At least one of the first holes 720 and at least one of the second holes 724 may be used to cool each of the first poles 728. At least one of the first holes 720 and at least one of the second holes 724 may be used to cool each of the second poles 730.

Enclosed within each of the first poles 728 and second poles 730 are a first slot 732, a second slot 734, a third slot 736, and a fourth slot 738. A plurality of first slots 732, second slots 734, third slots 736, and fourth slots 738 may be located radially about the cavity 706. The first and second slots 732, 734 may be radially closer to the axis 708 than the third and fourth slots 736, 738. The first and second slots 732, 734 may each house and partially enclose a first magnet 742*a* or a second magnet 742*b*. The third and fourth slots 736, 738 may each house and partially enclose a third magnet 744*a* or a fourth magnet 744*b*.

Each of the magnets do not fill the entirety of the volume their respective slots. For example, a magnet housed by the first slot 732 may be located between a pair of voids on opposite sides of the magnet and partially enclosed by the first slot 732. A magnet housed by the second slot 734 may be located between a pair of voids on opposite sides of the magnet and partially enclosed by the second slot 734. A magnet housed by the third slot 736 may be located between a pair of voids on opposite sides of the magnet and partially enclosed by the third slot 736. A magnet housed by the fourth slot 738 may be located between a pair of voids on opposite sides of the magnet and partially enclosed by the fourth slot 738.

There may be a plurality of first magnets 742*a*, second magnets 742*b*, third magnets 744*a*, and fourth magnets 744*b*. For one example, each of the first poles 728 may enclose and have a magnetic charge created by the first magnets 742*a* and third magnets 744*a*. For this example, each of the second poles 730 may enclose and have a magnetic charge created by the second magnets 742*b* and fourth magnets 744*b*.

The first and second slots 732, 734 may be separated at an angle 739, such that the first and second slots 732, 734 are positioned to form a v like shape. Likewise, third and fourth slots 736, 738 may be separated at an angle 740, such that the third and fourth slots 736, 738 are positioned to form a v like shape. For one example angle 739 may have the same dimensions as angle 740. The third and fourth slots 736, 738 are nested between the first and second slots 732, 734 such that they are located radially above angle 739.

The first magnets 742*a* and second magnet 742*b* may share dimensions such as length, width, and approximate shape. The third magnets 744*a* and fourth magnets 744*b* may share dimensions such as length, width, and approximate shape. The first magnets 742*a* may be of a different charge than the second magnets 742*b*. The third magnets 744*a* may be of a different charge than the fourth magnets 744*b*. The first magnets 742*a* and third magnets 744*a* may be of the same charge, and the second magnets 742*b* and fourth magnets 744*b* may be of the same charge. For example, the first and third magnets 742*a*, 744*a* may be of positive charge, and the second and fourth magnets 742*b*, 744*b* may be of a negative charge.

When housing magnets, first slot 732, second slot 734, third slot 736, and fourth slot 738 may form a permanent magnetic pole, such as the first pole 728 or second pole 730. For one example, the first magnets 742*a* and third magnets 744*a* may form the first poles 728. For this example, the second magnets 742*b* and fourth magnets 744*b* may form the second poles 730.

Each instance of the first slot 732, second slot 734, third slot 736, and fourth slot 738 may alternate between housing positively charged magnets, such as first and third magnets 742*a*, 744*a*, or negatively charged magnets, such as second and fourth magnets 742*b*, 744*b*. Thermal energy, such as heat, may be transferred from the magnets, such as the first magnets 742*a*, second magnets 742*b*, third magnets 744*a*, and fourth magnets 744*b*, to the material of the housing 704 via conductive heat transfer. Likewise, thermal energy, such as heat, may be transferred from the material of the housing 704 to the surfaces 722, 726 of the first and second holes 720, 724, respectively, via conduction. For one example, thermal energy may be transferred to a fluid, such as lubricant and/or coolant, enclosed by the first outer passages 324*a* and first holes 720 via conduction between the fluid and surfaces 722. Additionally, for this example, thermal energy may be transferred to a fluid, such as lubricant and/or coolant, enclosed by the second outer passages 324*b* and second holes 724 via conduction between the fluid and surfaces 726. The convection of the fluid through the first and second outer passages 324*a*, 324*b* may further remove thermal energy from the surfaces 722, 726, respectively. Convection of fluid through the first and second outer passages 324*a*, 324*b* may also equalize thermal energy and reduce temperature differentials throughout the fluid. The first outer passages 324*a*, second outer passage 324*b*, first inner passages 326, and second inner passages 327 may be enclosed by the features of the rotor core 702 and therein may act as internal coolant channels, such as internal oil channels, for the rotor core 702. These internal coolant channels may be approximately linear along the majority of the axial length of the rotor shaft 408, with respect to the axis 308, and the rotor core 702, with respect to the axis 708.

In this way, a cooling system formed of a cooling network described above may provide equal flow for each magnetic pole of the rotor and increase the uniformity of temperature across the rotor core. Flowing fluid, such as coolant, in a both a first direction and a second direction through inner passages may reduce the prevalence of a temperature gradient. Likewise, flowing fluid first and second direction through a plurality first passages and second passages, respectively, of outer passages may reduce the temperature gradient across the rotor core. Additionally, changing the direction of the fluid between the inner passages and outer passages by the features of the plates, may further increase the symmetry and uniformity of temperature across the rotor core. Having fluid flow from a channel in the shaft, to inner passages, and to outer passages, may increase temperature uniformity and may reduce multiple entry points to a single entry point for coolant to the rotor core.

Additionally, the holes of the end plates may be used to direct coolant toward features of the electric machine, such as stator end windings, to increase the utility of the coolant for temperature mitigation and decrease the components of the electric machine.

The technical effect of the disclosed methods and systems is reduced incidence of using more power than planned and increased confidence when using a power interface feature of an EV.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. Moreover, unless explicitly stated to the contrary, the terms “first,” “second,” “third,” and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An electric motor, comprising:

a rotor shaft having an internal oil channel therein and a plurality of radial feed oil channels positioned about an axial middle and center of the rotor shaft;

a rotor core including an inner surface facing an outer surface of the rotor shaft, the rotor core having a plurality of axial channels therein, wherein the plurality of axial channels includes inner channels formed partially by indentations in the inner surface of the rotor core and positioned between the rotor core and the rotor shaft; and a pair of end plates coupled to the rotor shaft, where each end plate has alternating inclined channels and alternating drain holes so as to alternate a flow direction of oil in each adjacent pole, wherein the alternating inclined channels form from and extend tangentially with respect to a circumference of an inner surface of each end plate.

2. The electric motor of claim 1, wherein the alternating inclined channels are configured to deliver oil to every other magnetic pole, and there is at least one alternating inclined channel for each the inner channels.

3. The electric motor of claim 1, wherein the alternating drain holes are configured to receive expelled oil from every other magnetic pole, and the electric motor further includes a shield positioned axially outside of each end plate and configured to redirect the expelled oil from the alternating drain holes to stator end windings.

4. The electric motor of claim 1, wherein each inclined channel is angled as to extend inclined toward a radial feed oil channel from a drain hole.

5. The electric motor of claim 4, wherein the alternating inclined channels each extend tangentially in a same rotational direction.

6. The electric motor of claim 5, wherein the alternating drain holes are positioned between an inner diameter and an outer diameter of each end plate, and wherein a sectional area of the alternating drain holes formed by a boundary of a surface of each endplate form a triangular shape with beveled corners that are smooth.

7. The electric motor of claim 1, wherein the rotor shaft further includes a plurality of axial oil channels.

8. The electric motor of claim 7, wherein the plurality of axial oil channels in the rotor shaft extend along the outer surface traversing a majority of an axial length of the rotor shaft.

9. The electric motor of claim 8, wherein the plurality of axial oil channels in the rotor shaft are linear along the majority of the axial length of the rotor shaft.

10. The electric motor of claim 1, wherein the electric motor is an interior permanent magnet electric motor.

11. The electric motor of claim 10, wherein permanent magnets are positioned in a v-shape and located radially outward of the plurality of axial channels in the rotor core.

12. A method for operating an electric motor, comprising:

flowing oil to cool the electric motor, including flowing oil to a rotor shaft of the electric motor having an internal oil channel therein and a plurality of radial feed oil channels positioned about an axial middle and center of the rotor shaft; and flowing oil to a rotor core, the rotor core having a plurality of axial channels therein, wherein the plurality of axial channels includes inner channels between an inner surface of the rotor core, and an outer surface of the rotor shaft, wherein the inner surface of the rotor core faces the outer surface of the rotor shaft, and the flowing oil travels through the plurality of radial feed oil channels to the inner channels and along the inner channels in a first direction towards a first end of the rotor shaft and in a second direction towards a second end of the rotor shaft, wherein a pair of end plates are coupled to the rotor shaft, where each end plate has alternating inclined channels and alternating drain holes so as to alternate a flow direction of the oil in each adjacent pole, and wherein the alternating inclined channels form from and extend tangentially with respect to a circumference of an inner surface of each end plate.

13. The method of claim 12, wherein the alternating inclined channels are configured to deliver oil to every other magnetic pole.

14. The method of claim 13, wherein the alternating drain holes are configured to receive expelled oil from every other magnetic pole.

15. The method of claim 14, wherein the alternating inclined channels are substantially linear and aligned substantially tangentially to an inner diameter of each end plate.

16. The method of claim of claim 15, wherein the alternating inclined channels each extend tangentially in a same rotational direction.

17. The method of claim 16, wherein the alternating drain holes are positioned between the inner diameter and an outer diameter of each end plate.

18. The method of claim 12, wherein the rotor shaft further includes a plurality of axial oil channels.

19. The method of claim 18, wherein the plurality of axial oil channels in the rotor shaft extend along the outer surface traversing a majority of an axial length of the rotor shaft.

20. The method of claim 19, wherein the plurality of axial oil channels in the rotor shaft are linear along the majority of the axial length of the rotor shaft, wherein the electric motor is an interior permanent magnet electric motor, and wherein permanent magnets are positioned in a v-shape and located radially outward of the plurality of axial channels in the rotor core.

* * * * *